United States Patent
Vollmer et al.

(10) Patent No.: US 6,947,776 B2
(45) Date of Patent: Sep. 20, 2005

(54) METHOD FOR OPERATING A COMMUNICATIONS NETWORK IN A POWER-SAVING MODE

(75) Inventors: Vasco Vollmer, Holle (DE); Matthias Hofmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 188 days.

(21) Appl. No.: 10/399,297

(22) PCT Filed: Sep. 28, 2001

(86) PCT No.: PCT/DE01/03738

§ 371 (c)(1),
(2), (4) Date: Sep. 2, 2003

(87) PCT Pub. No.: WO02/32048

PCT Pub. Date: Apr. 18, 2002

(65) Prior Publication Data

US 2004/0039949 A1 Feb. 26, 2004

(30) Foreign Application Priority Data

Oct. 13, 2000 (DE) .......................... 100 50 912

(51) Int. Cl.⁷ ................................ H04B 1/38
(52) U.S. Cl. ................. 455/574; 455/572; 455/556.1; 713/300

(58) Field of Search ................. 455/574, 572, 455/556.1, 550.1, 552.1, 553.1, 554.1, 554.2; 713/300, 323, 324, 321

(56) References Cited

U.S. PATENT DOCUMENTS

| | | |
|---|---|---|
| 5,652,893 A | 7/1997 | Ben-Meir et al. |
| 5,784,628 A | 7/1998 | Reneris |
| 5,787,298 A | 7/1998 | Broedner et al. |
| 5,821,924 A * | 10/1998 | Kikinis et al. ............ 345/212 |
| 5,987,614 A * | 11/1999 | Mitchell et al. ........... 713/300 |
| 6,272,116 B1 * | 8/2001 | Kurihara .................. 370/311 |
| 6,807,159 B1 * | 10/2004 | Shorey et al. ............. 370/318 |

OTHER PUBLICATIONS

IEEE, "P1394a Draft Standard for a High Performance Serial Bus (Supplement)," Sep. 1999.
The HAVi Specification 1.0, HAVi Organization, Jan. 18, 2000, pp. 1–467.

* cited by examiner

Primary Examiner—Melur Ramakrishnaiah
(74) Attorney, Agent, or Firm—Kenyon & Kenyon

(57) ABSTRACT

In order to operate a communications network in a power-saving mode, a central processing unit decides, on the basis of activities and/or states, if it is possible to switch network elements to the power-saving mode. A forthcoming switch to the power-saving mode is announced to the network elements.

8 Claims, 1 Drawing Sheet

METHOD FOR OPERATING A COMMUNICATIONS NETWORK IN A POWER-SAVING MODE

FIELD OF THE INVENTION

The present invention is directed to a method for operating a communications network in a power-saving mode.

BACKGROUND INFORMATION

A serial bus system is known from IEEE Standard 1394 [1], the different terminals (nodes) being connected either by a 4–6-wire cable or by an optical waveguide. At least one node may be designed in such a way that it can assume additional management functions for the network (bus management).

In addition to the above standard, there is a bus-independent extension specified under the name HAVi (Home Audio/Video interoperability) [2]. This HAVi specification describes in particular the remote control of devices using a resource manager which reserves a resource (device) on request and also releases it again.

In the HAVi specification, we have described a distributed model, the devices being controlled by control modules known as device control modules (DCMs). These DCMs operate as a software element on the device intended to perform control functions on a different device. A DCM is always specific to a certain device or class of devices.

SUMMARY OF THE INVENTION

An effective network-wide coordination of the power-saving states is attained with the present invention. This makes it possible to employ this method in a vehicle in which low power consumption in the idle state is a critical requirement.

DETAILED DESCRIPTION

The present invention is explained referring to the serial bus system according to IEEE Standard 1394 [1], the extension according to the HAVi specification [2] also being referred to. For a better understanding, a description of the IEEE Standard 1394 and the HAVi specification will be given before the actual explanation of the present invention. In addition, several terms are explained for better understanding.

Figure 1:
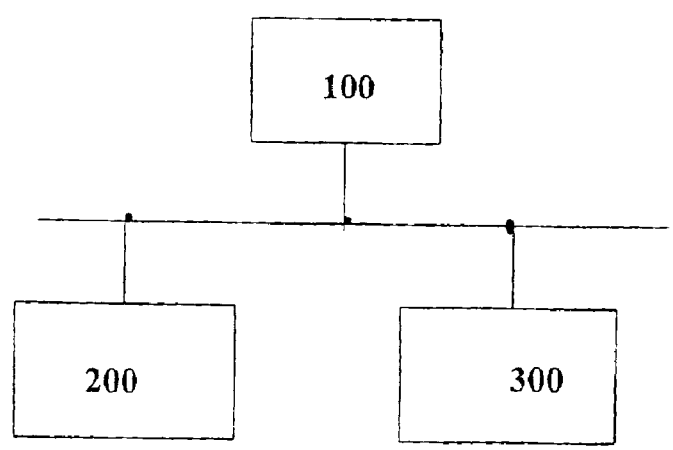
FIG. 1 shows a network topology of a bus system.

According to FIG. 1, the various terminals (nodes) are connected either by a 4–6-wire cable or by an optical waveguide. A node maybe configured as either an end piece (leaf) 100 or as a relay node (branch) 200, 300. The topmost node is designated as a root. The use of the various node types makes it possible to build up a suitable topology of the network. A leaf receives information packets and processes them if the target address of the packet matches its own. In addition, a branch must send all packets that it receives on one port to all other ports.

IEEE 1394 provides that the network is self-configuring, i.e., after power-up or a reset, all nodes automatically send a number of selected pieces of information about themselves into the network. This information is received by all nodes.

A node may be configured in such a way that it is able to assume additional management functions for the network (bus management). To that end, it collects all information from the other nodes, processes it and suitably stores it internally. Should multiple nodes have bus management capabilities, there is a competition process from which one node emerges as the winner and then assumes the bus management function.

In addition to the methods as described in the specifications for IEEE 1394, there is the bus-independent extension HAVi, which is suitable for use in an IEEE 1394 network. In particular, the remote control of devices from any other point in the network is described in the HAVi specification. To that end, a distributed model is described, the devices being controlled by control modules known as device control modules (DCMs). These DCMs operate as a software element on the device that wants to perform control functions on a different device. A DCM is always specific to a certain device or a class of devices. The functional component modules represent another group of software elements, a plurality of which may be arranged hierarchically below a DCM, each of which being responsible for the control of a specific functional part of a device.

The HAVi components used in connection with the invention are explained below: HAVi is based on a modular concept for a distributed system. The individual modules represent network elements, software elements in particular. All network elements in the system are addressed uniformly. In most cases, network elements may be arranged both centrally as well as distributed. This means the possibility for an implementation with only one entity of a specific software element, e.g., stream manager, or even an implementation that provides such an entity in every device.

The following network elements are present in the system:

Stream Manager: The stream manager (SM) is used to establish and terminate as well as manage connections between software elements and/or devices. Like the registry, the stream manager may be configured as a distributed system. Special commands are used to obtain the status of all SMs or of a specific SM.

Event Manager: The event manager transports messages on status changes in the system to the communication participants.

Registry: The registry contains information concerning each software element available in the network and each available device. Information concerning the individual software elements is stored in attributes. In addition to the predefined attributes, it is possible to add others. The architecture of the registry is a distributed system, i.e., each device may contain a part of the entire registry; however, it may also be contained centrally. This is invisible for access to the registry since the various entities of the registry within the network exchange the requested information automatically if necessary.

Resource Manager: The resource manager reserves and releases resources (devices, software elements) and stores planned events (e.g., VCR recordings).

DCM Manager: The DCM manager is responsible for the installation and deinstallation of DCMs in appropriate devices.

Device Control Module: A device control module (DCM) is a software element that combines one or more FCMs into a device driver.

Functional Control Module: A functional control module (FCM) is a software element used to activate a functional unit of a device (e.g., a CD drive or an FM tuner). A DCM is formed from the basic functions common to all DCMs and device-specific FCMs.

These, or the modules needed in a device at any time, form a uniform application interface. This uniform interface brings about interoperability between applications and devices of different manufacturers (Interoperability API).

It is possible to use the method of the present invention in a system based on the HAVi standard [3]. A power manager element identified below as a local power-saving mode control unit 3 is added to the network elements described there, the power manager element being responsible for the local management of the power-saving modes. One of the entities of the power manager present in the entire network is chosen for power master as central processing unit 2 on initialization of the system and is accordingly responsible for the network-wide coordination of the power-saving states of the network elements. Based on diverse information (e.g., bus activity, battery status, ignition on/off), central processing unit 2 makes a decision concerning changing the power-saving mode of one or more or all devices in the network. If the driver has left the vehicle, the ignition is off and the bus activity is nearly zero. The central processing unit assesses these criteria to switch to power-saving mode. To that end, central processing unit 2 sends appropriate commands to selected (unicast, multicast) or all (broadcast) devices/network elements in the network. When central processing unit 2 makes a decision internally to switch all devices into the power-saving state, in normal operation, it first sends an announcement concerning the forthcoming status change in the network. On receiving this announcement, local power-saving mode control units 3 check if it is possible to make the switch or if activity (users or resources) is still present in the device. If a device agrees to the status change, power-saving mode control unit 3 of this device confirms the announcement positively, or otherwise negatively. After a positive confirmation; it is advantageous in particular if the device does not permit new activities to be started so as not to interfere with the further progress. In the case of a negative confirmation, it is possible for the device to transmit additional information in its reply concerning which parts within the device (software elements) still have activity. This makes it possible to detect defective or incorrectly behaving devices.

After a positive confirmation from all the devices in the network, central processing unit 2 transmits a request to switch to power-saving mode. It is still possible for a power-saving mode control unit 3 in a device to reject this request and thus interrupt the status change. Otherwise, the devices switch their states as requested.

In addition to this cooperative method, there is an uncooperative method for exceptional cases in which central processing unit 2 sends a force command, i.e., a compulsory status change, in particular by a special identification of an announcement. On receipt of this command, a device has no possibility of rejection but instead should complete the status change, at least after a specified period of time.

Figure 2:
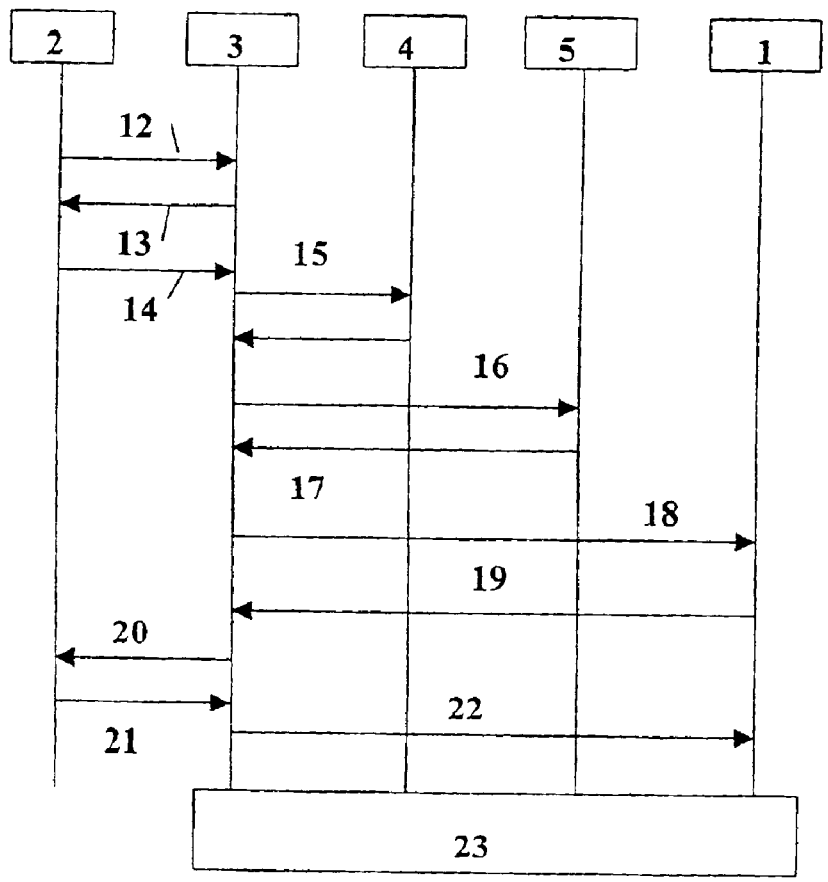
FIG. 2 shows a function diagram for the control of the power-saving mode.

A specific exemplary embodiment will be explained below with reference to FIG. 2. One of the devices located in the system was selected as central processing unit 2 (power master) on initialization of the system.

The following function calls are used to implement the described method:

```
Status GetPowerMode (OUT PowerMode) (12)
Status SetPowerMode (
    IN PowerMode newPowerMode,
    In RequestMode mode,
    OUT sequence<SEID> seidList)
Status ChangePowerMode (
    IN RequestMode mode,
    IN boolean application,
    OUT boolean confirmed,
    OUT wstring<50> info)
```

Based on information available to it (e.g., bus utilization, ignition key position, position of the central locking system, passenger compartment sensors), the power master (central processing unit 2) decides that one or more (even all if necessary) devices in the system are no longer needed and should be switched to power-saving mode. To this end, it uses GetPowerState 12, 13 to query the local power managers (power-saving mode control units 3) in the system concerning which mode the network elements/devices 1 are in.

Using SetPowerMode (mode=ANNOUNCE) 14, power master 2 announces the forthcoming switch to local power-saving mode control units 3 of the devices that are supposed to switch their power mode. Using their stream manager 4 (GetLocalConnectionMap 15) and their registry (GetElement 16, 17), the local power managers 3 check whether and which resources are reserved in their devices.

Using ChangePowerMode (mode=ANNOUNCE 18), the forthcoming power mode switch is announced to the software (network) elements 1 that are still reserving resources. In their reply (19), the software elements are able to report if the switch is possible or not from their point of view. In the event of a negative reply, according to the cooperative method, at least one of these software elements will reject the query of power master 2 via the local power manager 3 assigned to it. In this case, the process is interrupted.

If power master 2 receives a positive reply to the announcement (20), it repeats the message SetPowerMode with mode=SET 21. Thereupon, the devices addressed switch to selected power mode 23 via a message 22 from their power manager 3.

Following is an example of a non-cooperative switch to the power-saving status: Power master 2 receives the information that the status of a power source, the charge state of the battery in particular, is critical and decides that all devices in the system should immediately switch to a power-saving mode. To prevent as far as possible the operation from being delayed by a rejection of the announcement as in the example described above, power master 2 sets the mode parameter in the message SetPowerMode to FORCE. For their part, local power managers 3 are set to ChangePowerMode mode=FORCE. Thus all software elements know that the system will now be powered down. In the FORCE mode, the software elements are not able to reject the announcement but instead must immediately power down.

It may also be specified that in the absence of a confirmation of the announcement by power master 2 or on receipt of a specially identified announcement (FORCE), power master 2 or local power manager 3 automatically makes the switch to power-saving mode after a specified time.

It is advantageous in particular if the power master also assumes the functions of the isochronous resource manager and the cycle master on the IEEE 1394 bus.

As an alternative, a power manager 3 may send positive acknowledgments to calls with 'SET' and 'FORCE'. As a result, power master 2 is able to check if all devices were reached and repeat the corresponding command if necessary.

Literature

[1] IEEE, "P1394a Draft Standard for a High Performance Serial Bus (Supplement)," September, 1999
[2] IEEE, "P1394b Draft Standard for a High Performance Serial Bus (Supplement)," February, 2000
[3] HAVi Organization, "The HAVi specification 1.0, " January, 2000
[4] MOST-Cooperation, "MOST specification Rev 2.0, " December, 1999

What is claimed is:

1. A method for operating a communications network in a power-saving mode, comprising:

providing a central processing unit for a network-wide coordination of power-saving states of network elements, the central processing unit performing a decision, on the basis of at least one of activities and states for devices in the network, if it is possible to switch one of at least one of the network elements and the devices assigned thereto to the power-saving mode;

announcing to the network elements a forthcoming switch to the power-saving mode based on the decision;

upon receipt of an announcement by the central processing unit to switch to the power-saving mode, checking by a local power-saving mode control unit one of if it is possible to make the switch and if there are still activities in the devices that should prevent the switch to the power-saving mode for at least a specified period of time;

positively confirming by the local power-saving mode control unit the announcement to switch to the power-saving mode if the one of the network elements assigned thereto also agrees to a status change, otherwise the local power-saving mode control unit sends a negative confirmation; and in the event of the negative confirmation, causing the one of the network elements additionally to communicate in a reply which parts within the one of the network elements still have activity.

2. The method as recited in claim 1, wherein:

after the positive confirmation, the one of the network elements no longer permits new activities to be started.

3. The method as recited in claim 2, wherein:

one of the local power-saving mode control unit and the central processing unit detects from an activity message if one of defective and improperly behaving network elements are present.

4. The method as recited in claim 1, wherein:

in the event of the positive confirmation from all of the network elements in the network, the central processing unit transmits a request to switch to the power-saving mode.

5. The method as recited in claim 1, wherein:

the central processing unit, on receipt of an announcement that a state of a power source is critical, identifies the announcement in such a way that it is not possible to reject the announcement but instead the switch to the power-saving mode must be made.

6. The method as recited in claim 5, wherein:

one of if the announcement is not confirmed and another announcement with special identification is received, one of the central processing unit and the local power-saving mode control unit makes the switch to the power-saving mode after a specified period of time.

7. The method as recited in claim 1, wherein:

the local power-saving mode control unit always issues a positive confirmation of an announcement for the switch to the power-saving mode so that the central processing unit is able to check if all of the network elements were reached and it is possible to repeat the announcement if necessary.

8. The method as recited in claim 1, wherein:

the central processing unit takes over as at least one of an isochronous resource manager and a cycle master on a bus in conformity with Standard IEEE 1394.

* * * * *